United States Patent [19]
Matsui et al.

[11] Patent Number: 6,130,715
[45] Date of Patent: *Oct. 10, 2000

[54] FINE TUNING LENS DRIVING APPARATUS OF TV CAMERA

[75] Inventors: Nobuo Matsui; Hisao Takemae, both of Omiya, Japan

[73] Assignee: Fuji Photo Optical Co., Ltd., Omiya, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/711,785

[22] Filed: Sep. 10, 1996

[30] Foreign Application Priority Data

Sep. 14, 1995 [JP] Japan .................................... 7-237184

[51] Int. Cl.[7] .................................................. G03B 13/00
[52] U.S. Cl. ............................ 348/345; 348/357; 396/133
[58] Field of Search .................................... 348/335, 345, 348/347, 351, 354, 357, 358; 396/103, 134, 136, 137, 97, 142, 133

[56] References Cited

U.S. PATENT DOCUMENTS

| | | | |
|---|---|---|---|
| 4,508,443 | 4/1985 | Matsuzaki et al. | 396/133 |
| 4,920,420 | 4/1990 | Sano et al. | 358/227 |
| 5,293,268 | 3/1994 | Ihara et al. | 359/704 |
| 5,406,069 | 4/1995 | Hirasawa | 250/201.4 |
| 5,508,852 | 4/1996 | Bednarsky et al. | 359/823 |
| 5,751,353 | 5/1998 | Tanaka et al. | 348/335 |
| 5,758,209 | 5/1998 | Rogers | 396/103 |

*Primary Examiner*—Wendy Garber
*Assistant Examiner*—Jacqueline Wilson
*Attorney, Agent, or Firm*—Nixon Peabody LLP; David S. Safran

[57] ABSTRACT

A motor for a focus fine tuning lens is attached to the side of a lens barrel. The motor connects to a lens holding frame of the fine tuning lens via a belt, so that the backlash can be prevented. Because the motor and a belt transmission mechanism are accommodated by a drive unit, the existing drive unit can be used without changing its size and form.

5 Claims, 4 Drawing Sheets

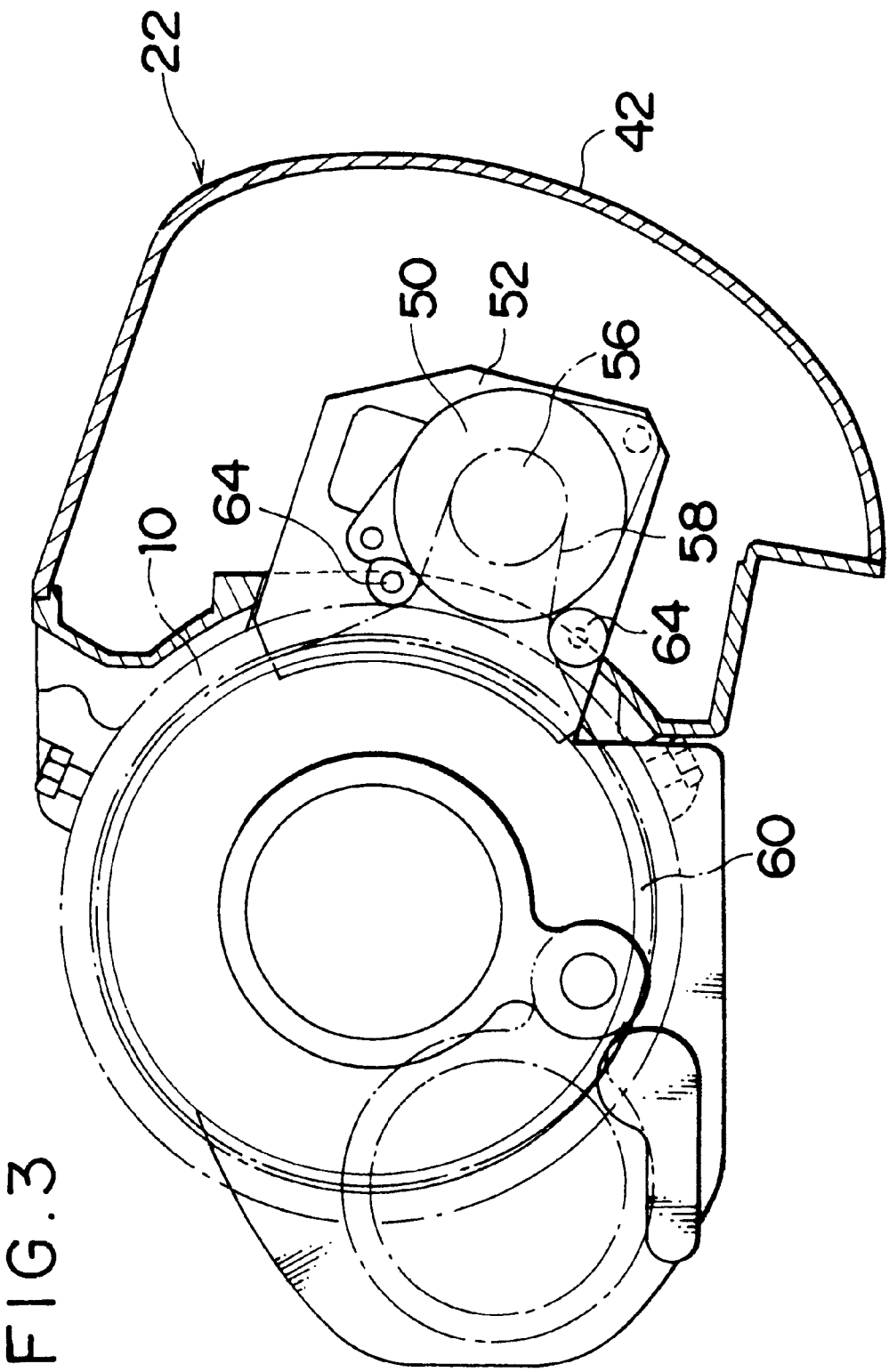

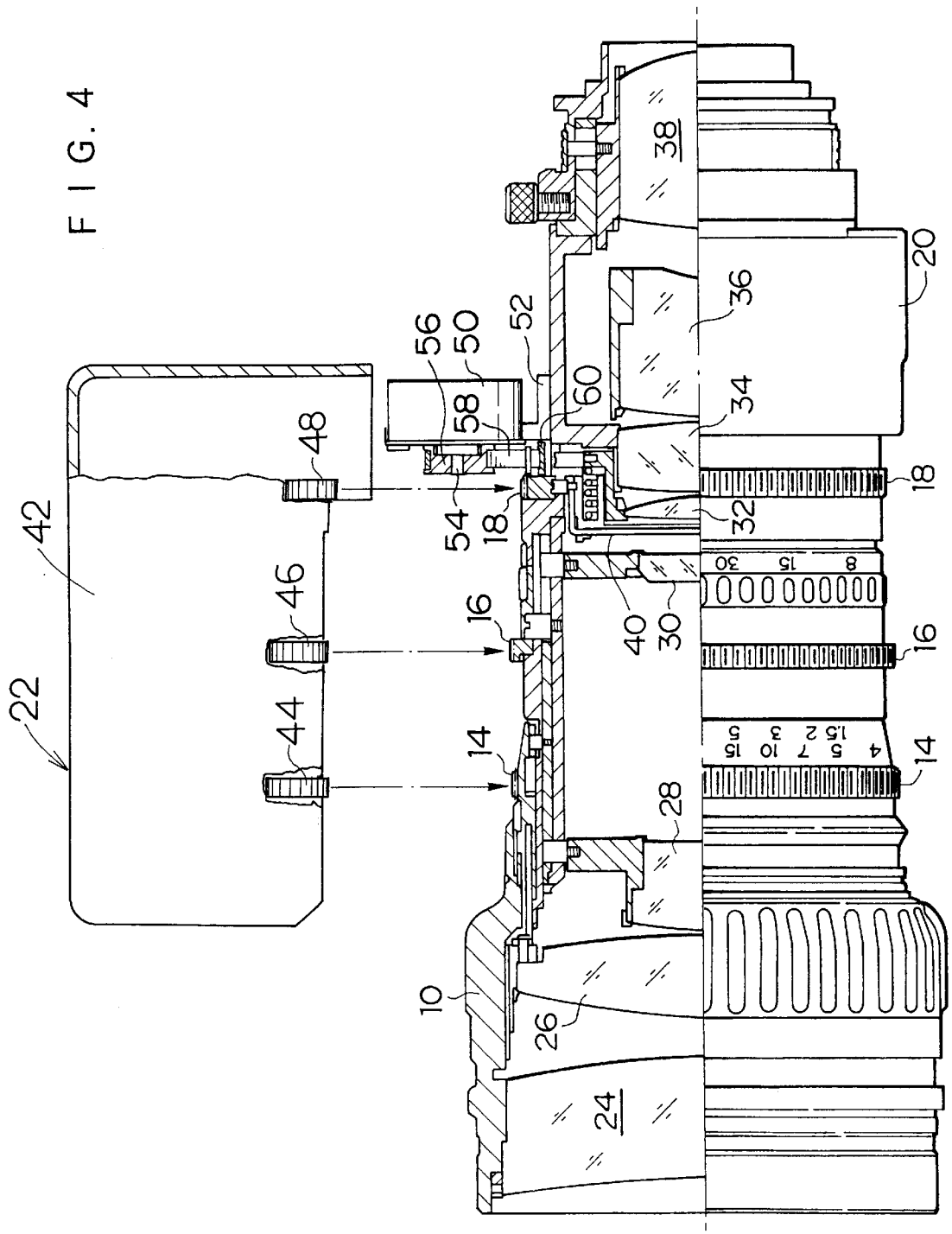

FINE TUNING LENS DRIVING APPARATUS OF TV CAMERA

BACKGROUND OF THE INVENTION

1. Field of the Invention

The present invention relates to a fine tuning lens driving apparatus of a TV camera, and more particularly to a fine tuning lens driving apparatus for an electronic news gathering (ENG) camera.

2. Description of the Related Art

In an ENG camera, a drive unit is provided at the side of a lens barrel of a TV lens, and a motor for driving a focus ring, a motor for driving a zoom ring, a motor for driving an iris ring, and so forth are arranged in the drive unit. These motors transmit the rotational force to the focus ring, the zoom ring, and the iris ring via gear transmitting mechanisms arranged in the drive unit.

However, in the conventional detection of a position of a focal point, the focus ring cannot be moved accurately due to the influence of backlash in the gear transmitting mechanism; therefore, the position of the focal point cannot be detected correctly.

SUMMARY OF THE INVENTION

The present invention has been developed under the above-described circumstances, and has its object the provision of a fine tuning lens driving apparatus of a TV camera, which is able to drive a fine tuning lens correctly without the influence of the backlash.

In order to achieve the above-mentioned object, a fine tuning lens driving apparatus of a TV camera in which a drive unit is provided at the side of a lens barrel of a TV lens, and a focus ring driving motor, a zoom ring driving motor, and an iris ring driving motor, which are provided in the drive unit, drive and rotate a focus ring, a zoom ring, and an iris ring, respectively, is characterized in that: a fine tuning lens motor is attached to the side of the lens barrel via a motor holding member, and an output shaft of the fine tuning lens motor connects to a driving ring of a fine tuning lens via a winding transmission apparatus so as to move the fine tuning lens forward and backward, so that the fine tuning lens motor and the winding transmission apparatus is accommodated by the drive unit.

According to the present invention, the fine tuning lens motor connects to the driving ring of the fine tuning lens via the winding transmission apparatus, so that the backlash can be prevented.

Moreover, according to the present invention, the fine tuning lens motor held by the lens barrel and the winding transmission apparatus are accommodated by the drive unit, so that the existing drive unit can be used without changing its size and form.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 3 is a sectional side elevation illustrating the embodiment according to the present invention, FIG. 4 is a view showing the drive unit being mounted over the fine tuning lens motor.

DETAILED DESCRIPTION OF THE PREFERRED EMBODIMENTS

Figure 1:
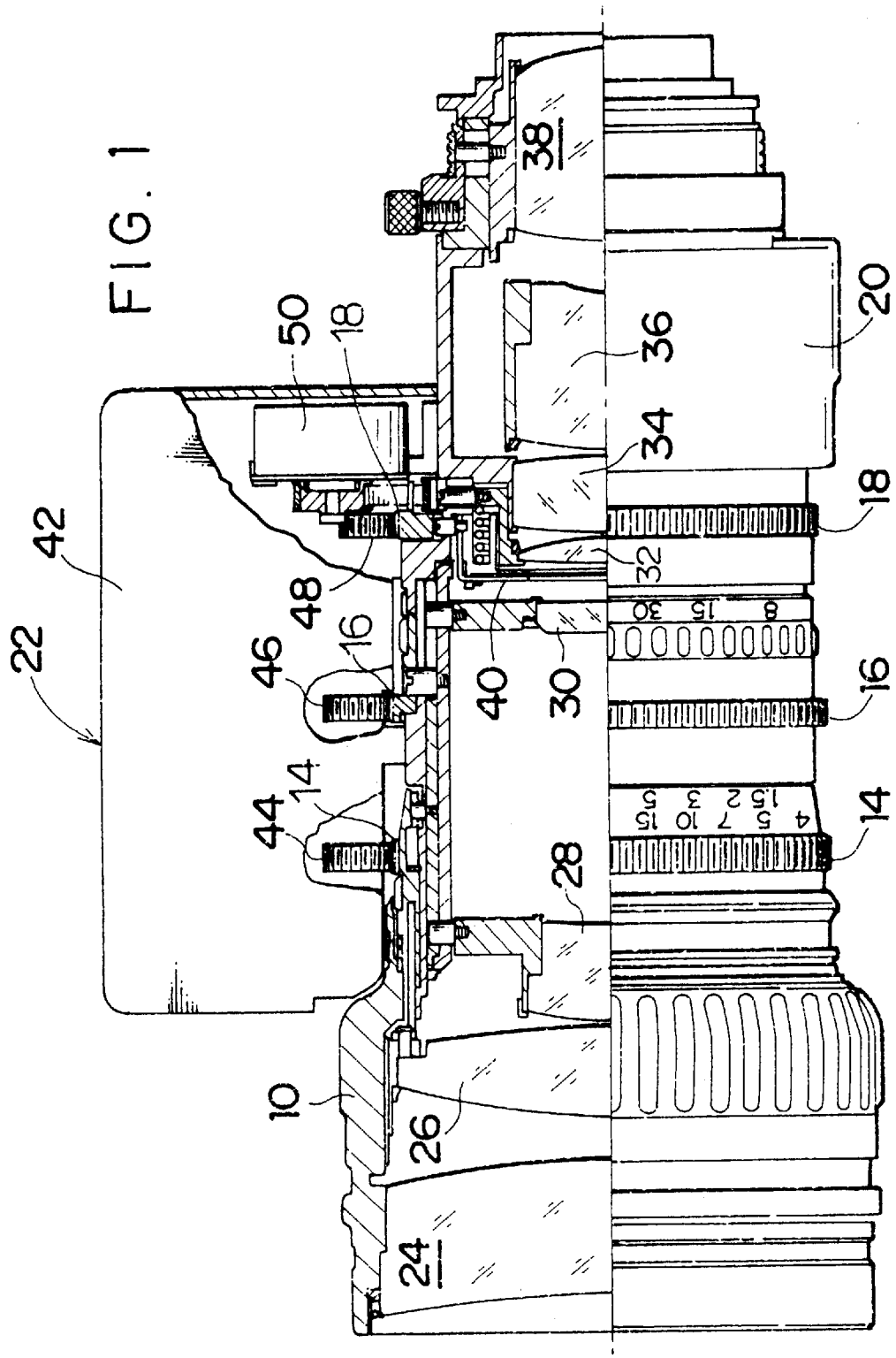
FIG. 1 is a partially sectional view illustrating the embodiment according to the present invention.

FIG. 1 shows a TV lens of an ENG camera, to which the present invention is applied. A lens barrel 10 of the TV lens is provided with a focus ring 14, a zoom ring 16, and an iris ring 18. An extender apparatus 20 is provided at the back end of the lens barrel 10. A drive unit 22 for driving the focus ring 14, the zoom ring 16, and the iris ring 18 are provided at the side of the lens barrel 10.

A fixed focus lens 24, a movable focus lens 26, zoom lenses 28 and 30, a fine tuning lens 32, a fixed relay lens 34, an extender 36, and a relay lens 38 are arranged in the lens barrel 10. The coarse focal adjustment is performed by rotating the focus ring 14 to move the movable focus lens 26. Then, the fine tuning lens 32 is moved (vibrated) at a high speed, and the peak value of a focal point is detected, so that the position of the focal point can be detected correctly. The zoom is adjusted by rotating the zoom ring 16 to move the zoom lenses 28 and 30, and the iris is adjusted by rotating the iris ring 18 to adjust the diameter of an iris 40.

The drive unit 22 has a case 42 secured to the side of the lens barrel 10 by screws (not shown). A focus ring driving motor (not shown) is disposed in the case 42, and the focus ring driving motor rotates a gear 44 via a gear transmitting mechanism (not shown), and rotates the focus ring 14 engaged with the gear 44.

Furthermore, a zoom ring driving motor (not shown) is disposed in the case 42, and the zoom ring driving motor rotates a gear 46 via a gear transmitting mechanism (not shown), and rotates the zoom ring 16 engaged with the gear 46.

Likewise, an iris ring driving motor (not shown) is disposed in the case 42, and the iris driving motor rotates a gear 48 via a gear transmitting mechanism (not shown), and rotates the iris ring 18 engaged with the gear 48.

Figure 2:
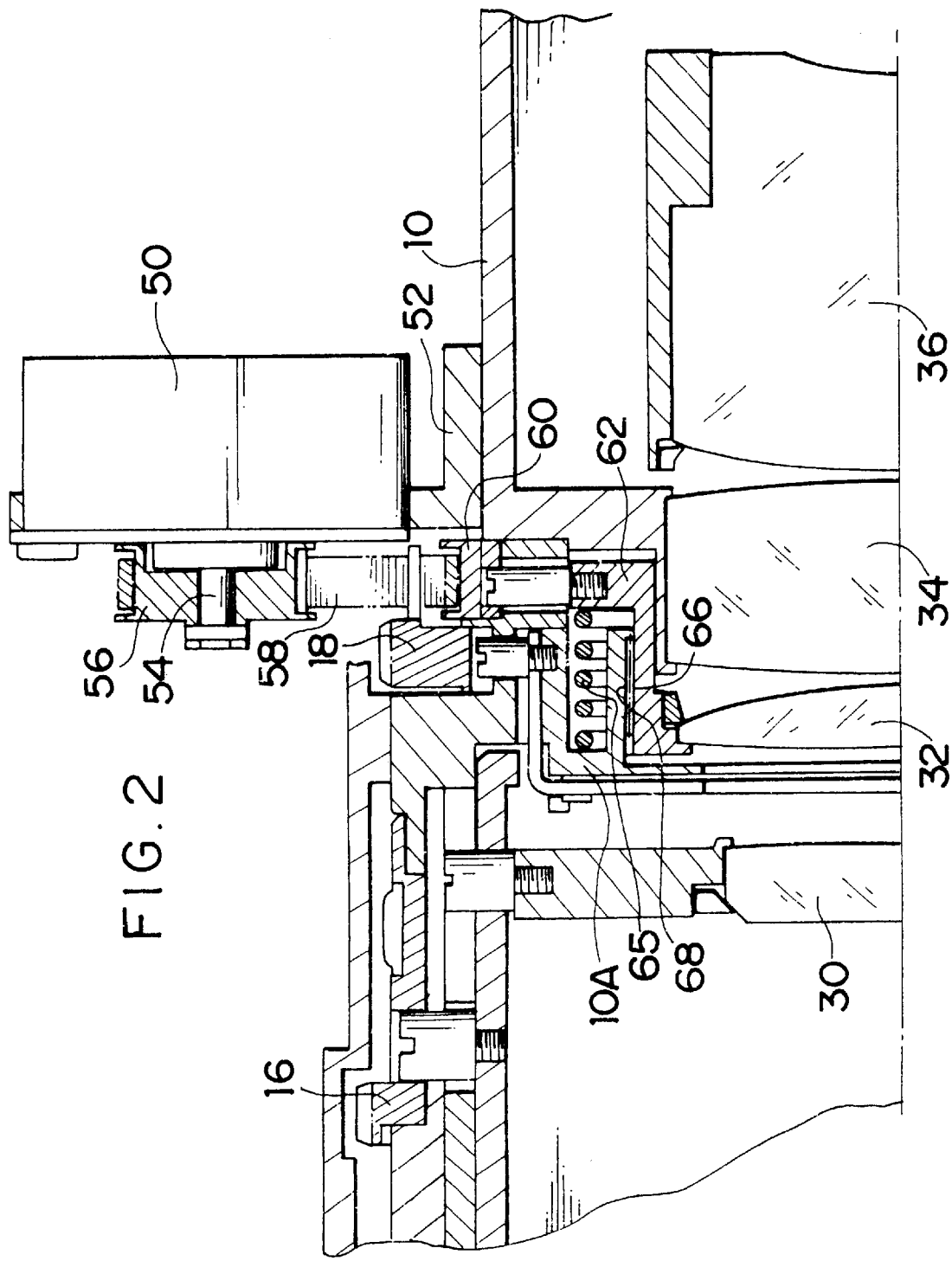
FIG. 2 is a grossly enlarged sectional view illustrating the essential portions of the embodiment according to the present invention.

As shown in FIGS. 2 and 3, a fine tuning lens motor 50 is attached to the lens barrel 10 via a bracket 52, of which section is L-shaped. A driving pulley 56 of a small diameter is provided on an output shaft 54 of the fine tuning lens motor 50, and the driving pulley 56 connects to a following pulley 60 of a large diameter via a belt 58.

The following pulley 60 is secured to a lens holding frame 62 of the fine tuning lens 32 via a pin (not shown). Therefore, when the fine tuning lens motor 50 is driven, the lens holding frame 62 is driven so as to rotate via the belt 58. Tension rollers 64 and 64 are provided at the belt 58 as shown in FIG. 3, and the tension rollers 64 and 64 apply the tension to the belt 58, so that the rotational force of the driving pulley 56 can be transmitted to the following pulley 60 without fail. A spring 65 is provided between a holding member 10A integrated with the lens barrel 10 and the lens holding frame 62. As a result, the lens holding frame 62 is pressed to the right-hand side in FIG. 2, so that the backlash in later-described screw connection can be eliminated. A male screw 66 is formed at the outer circumference of the lens holding frame 62, and a female screw 68 engaged with the male screw 66 is formed at the holding member 10A. Therefore, when the lens holding frame 62 is rotated by the driving force of the fine tuning lens motor 50, the fine tuning lens 32 moves forward and backward on the optical axis. The fine tuning lens 32 is moved forward and backward in such a state that there is no backlash between the male screw 66 and the female screw 68 because of the action of the spring 65.

Next, an explanation will be given about the operation in the preferred embodiment of the fine tuning lens driving apparatus of the TV camera according to the present invention, which is constructed in the abovementioned manner.

In the focal adjustment, the focus ring driving motor (not shown) at the drive unit 22 rotates the gear 44. As a result, the focus ring 14 rotates, and the movable focus lens 26 moves forward and backward, so that the coarse focal adjustment can be performed. Next, the fine tuning lens motor 50 is driven to rotate the lens holding frame 62 via the driving pulley 56, the belt 58, and the following pulley 60. When the lens holding frame 62 is rotated, the fine tuning lens 32 moves forward and backward at a high speed because the male screw 66 formed at the lens holding frame 62 is engaged with the female screw 68 formed at the holding member 10A. Then, the peak value of the focal point is detected, so that the position of the focal point is detected correctly. Thus, the fine focal adjustment can be performed.

According to the above-described embodiment, the backlash does not occur unlike the gear connection because the fine tuning lens motor 50 connects to the lens holding frame 62 via the belt 58. Further, the backlash between the male screw 66 and the female screw 68 can be prevented because the spring 64 is arranged between the holding member 10A and the lens holding frame 62.

Furthermore, according to the above-described embodiment, the fine tuning lens motor 50 is attached to the lens barrel 10 via the bracket 52, and the fine tuning lens motor 50 is accommodated by the case 42 of the drive unit 22. As a result, the existing drive unit is compatible because it can be used without changing its size and form.

In the above-described embodiment, the present invention is applied to the fine tuning lens 32 for focal adjustment; however, the present invention may also be applied to a fine tuning lens such as a lens for aberration correction, or the like.

Moreover in the above-described embodiment, the explanation is given about the belt transmission mechanism as the winding transmission apparatus; however, a wire, a chain, and so forth may also be used instead of the belt.

According to the present invention, the fine tuning lens motor connects to the driving ring of the fine tuning lens via the winding transmission apparatus, so that the backlash can be prevented. In the present invention, because the fine tuning lens motor held by the lens barrel and the winding transmission apparatus are accommodated by the drive unit, so that the existing drive unit can be used without changing its size and form.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A fine tuning lens driving apparatus of a TV camera wherein:

a fine tuning lens motor is attached to the side of said lens barrel of a TV lens via a motor holding member;

an output shaft of said fine tuning lens motor connects to a drive ring of a fine tuning lens through a winding transmission apparatus so as to move said fine tuning lens forward and backward;

a focus ring driving motor, a zoom ring driving motor, and an iris ring driving motor are provided in a drive unit having a space for containing said fine tuning lens motor; and said drive unit is detachably attached to said lens barrel, and when said drive unit is attached to said lens barrel, said focus ring driving motor drives a focus ring, said zoom ring driving motor drives a zoom ring, said iris ring driving motor drives an iris ring, and said fine tuning lens motor is housed in said space.

2. The fine tuning lens driving apparatus of the TV camera according to claim 1, wherein said fine tuning lens is a lens for focal adjustment.

3. The fine tuning lens driving apparatus of the TV camera according to claim 2, wherein said focus ring is rotated to move a focus lens by said focus ring driving motor so as to perform coarse focal adjustment, and then said driving ring of said fine tuning lens is rotated to move said fine tuning lens by said fine tuning lens motor so as to perform fine focal adjustment.

4. The fine tuning lens driving apparatus of the TV camera according to claim 1, wherein said fine tuning lens is a lens for aberration correction.

5. The fine tuning lens driving apparatus of the TV camera according to claim 1, wherein a belt is used for said winding transmission apparatus.

\* \* \* \* \*